July 2, 1968  H. Q. BIBB  3,390,901
QUICK DISCONNECT FLANGELESS WAVEGUIDE COUPLING
Filed Feb. 27, 1967  2 Sheets-Sheet 2
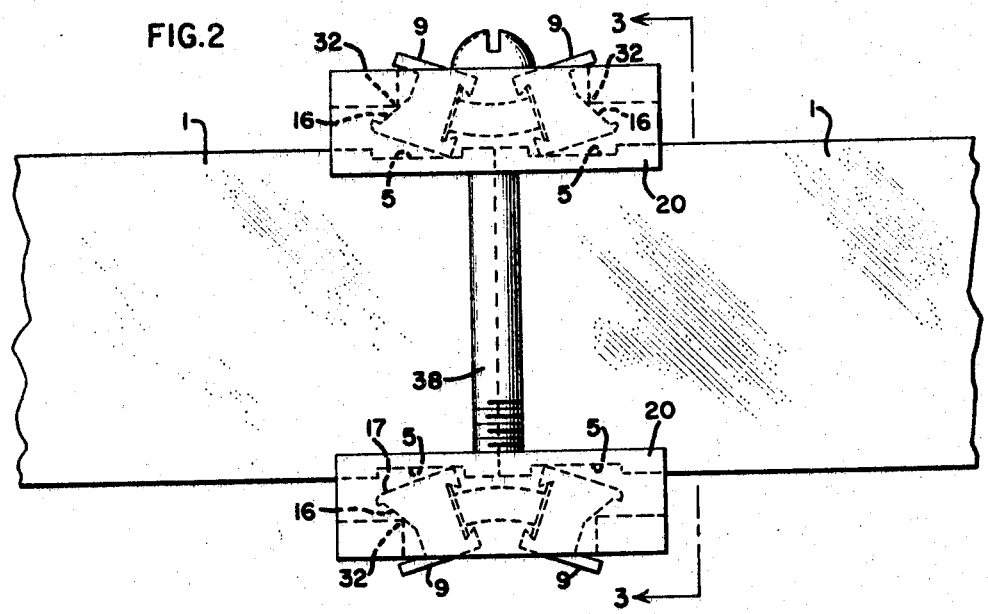
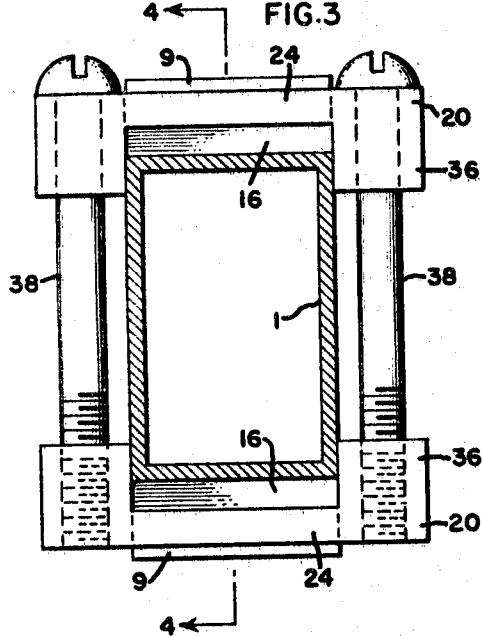
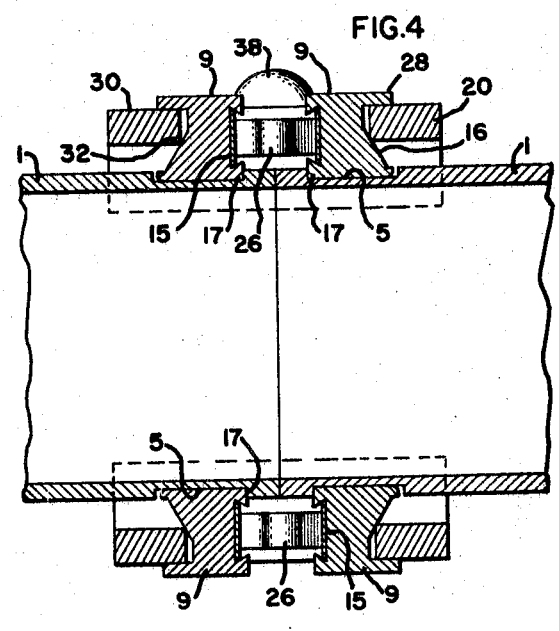
INVENTOR:
HENRY Q. BIBB,
BY J. David Blumenfeld
HIS ATTORNEY.

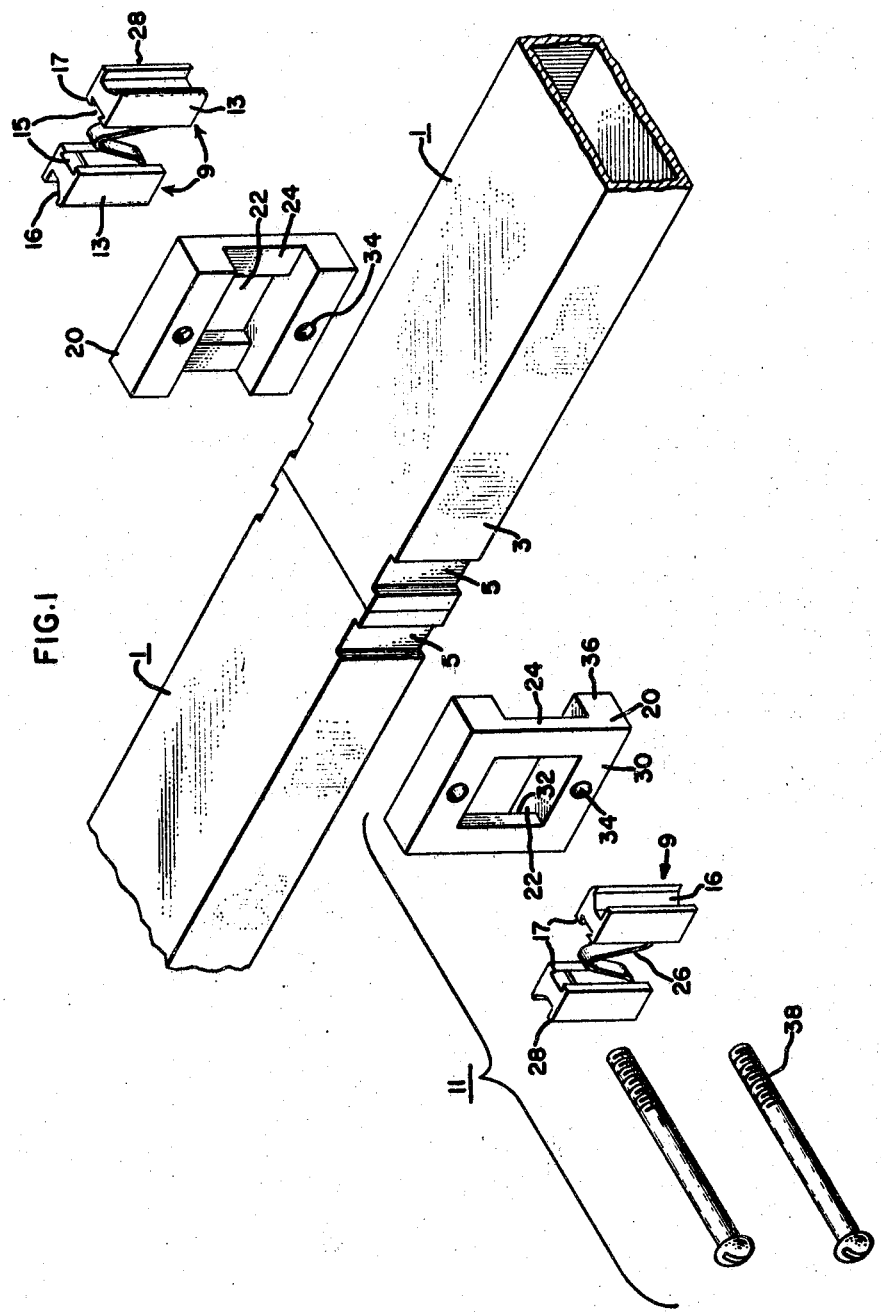

3,390,901
QUICK DISCONNECT FLANGELESS WAVEGUIDE COUPLING
Henry Quarles Bibb, Lynchburg, Va., assignor to General Electric Company, a corporation of New York
Filed Feb. 27, 1967, Ser. No. 623,498
4 Claims. (Cl. 285—406)

ABSTRACT OF THE DISCLOSURE

A quick disconnect waveguide coupling which consists of a pair of clamping members positioned on opposite sides of the waveguide sections. The clamping members engage cam surfaces on a pair of retaining shoes disposed in shallow slots in each piece of waveguide adjacent to the joint so that a force exerted to draw the clamp members together is translated into rotational movement of the shoes to exert force axially along the waveguide, thereby clamping the sections firmly together.

---

This invention relates to coupling means and, more particularly, to a simple, quick-disconnect coupling for joining waveguides.

Waveguides are well known devices for transmitting microwave energy. As such, they are used in a variety of applications in different physical environments, locations, and installations. Therefore, some means must be provided to join individual waveguide sections to accommodate the particular physical space environment in which the waveguide is to be utilized. More importantly, if at all possible, it is desirable that this be done right at the equipment installation site.

Hitherto, waveguide sections have generally been joined by soldering or brazing mating flanges to the ends of the sections to be joined. The faces of the opposing flange members may include annular grooves for receiving a gasket or seal of soft, deformable material, such as copper or rubber. The flanges and the interposed seals are then clamped together by a plurality of nut and bolt assemblies spaced around the flange members so that an RF-tight and, in some instances, a pressure-tight seal, is formed between the waveguide sections.

While these coupling arrangements have proved to be generally satisfactory, they do have certain disadvantages and limitations. Firstly, because the mating flanges of these coupling arrangements must be soldered or brazed to the waveguide sections, the waveguide must necessarily consist of a relatively expensive material, such as copper, which is capable of being brazed or soldered. Secondly, the very fact that the flanges must be brazed or soldered to the waveguide, and the fact that large numbers of bolt and nut assemblies must be employed, adds to the fabrication and assembly cost of the device. In addition to these direct costs, indirect costs such as lengthy assembly and installation time, difficulty in removing or adjusting the waveguide once installed, adds to the overall expense of these prior-art coupling arrangements. It is, therefore, an object of this invention to provide a waveguide coupling which may be quickly assembled and quickly disassembled or disconnected.

It is another object of this invention to provide a waveguide coupling wherein the soldering and brazing are unnecessary.

A further object of this invention is to provide a waveguide coupling which is always accessible so that removal or adjustment of particular waveguide sections is facilitated.

Other objects and advantages of this invention will become apparent as the description thereof proceeds.

The various benefits and advantages of the invention are realized in a waveguide coupling comprising a pair of generally U-shaped clamp members disposed on opposite sides of the waveguide sections to be joined. These clamp members span the junction of the waveguide sections and are held together by a pair of screw fasteners. Each clamp member in the assembled condition engages the cam surfaces of a pair of retaining shoes, each of which is disposed in a shallow slot in the surface of the waveguide section adjacent to their junction. As the screws are tightened, the clamp members are drawn together and cam the shoe members downwardly and inwardly against the wall of the slot, thus translating the force exerted by the clamps at right angles to the guide into an axial force along the guide. This axial pressure against the waveguide sections forces them together to provide an RF-tight seal. The coupling may then be quickly disconnected by releasing the screws and retaining shoes, thereby removing the axial force and separating the waveguide sections.

Other objects, features, and many of the attendant advantages of this invention will be appreciated more readily by reference to the following detailed description, taken in connection with the accompanying drawings, wherein:

FIGURE 1 is an exploded, perspective view of a pair of waveguide sections in the novel coupling arrangement of the present invention;

FIGURE 2 is a side-elevational view of the coupling at the juncture of the waveguide section prior to tightening of the screw members;

FIGURE 3 is a sectional view taken along line 3—3 of FIGURE 2; and

FIGURE 4 is a sectional view taken along line 4—4 of FIGURE 3, but with the clamp screws tightened.

FIGURES 1, 2 and 3 illustrate one form of the novel coupling arrangement for a pair of waveguide sections 1, which are to be joined to form a unitary waveguide assembly. Each waveguide section is shown to be of rectangular cross-section, and has a small, shallow slot 5 milled or otherwise formed at one end. Each slot extends across the narrow wall of the guide and receives a retaining shoe 9 which forms part of the novel coupling arrangement 11. Each shoe has a flat bottom surface 13, a spring-retaining slot 15 on one side, a cam surface 16 on the other side, and a tongue 17, extending between slot 15 and the bottom surface 13. With coupling 11 in the assembled state, the bottom of the shoe rests on the bottom of slot 5, and tongue 17 exerts axial force against a side wall of the slot to clamp the waveguide sections together. The inclined cam surface 16 of shoe 9 cooperates with a clamp member 20, presently to be described, to exert the axial force through tongue 17, thereby firmly securing the sections.

Clamp members 20 are disposed on opposite sides of the waveguide sections. Each clamp member has a generally U-shaped cross section and a rectangular opening or aperture 22 in the bight portion 24. Aperture 22 receives a pair of retaining shoes 9 which are held together by means of a serpentine spring 26 secured in the spring-retaining slots 15. Spring 26 forces the retaining shoes outwardly in the unassembled position and an upper flange 28 on each shoe extends through and above aperture 22. Flange 28 engages the flat upper surface 30 of the clamp, thereby retaining the shoes in the clamp. Inner edge 32 of bight 24 engages cam surface 16 of shoe 9 whenever the clamp members are assembled. It is through the co-operation of edge 32 with cam surface 16 of the shoes that the force, which is exerted to draw clamp members 20 together, is translated into a force exerted along the axis of the waveguide sections 1 to secure them firmly together.

A hole or bore 34 extends through each leg 36 of the clamp members, and these bores are internally threaded to receive screw fasteners 38. Screw fasteners 38 are sufficiently long to extend through the clamps on both sides of the waveguide, so that in the assembled state, as shown in FIGURE 2, clamp members 20 are joined as a single unit.

In assembling the waveguide coupling means to provide an RF-tight joint between the individual waveguide sections, a pair of retaining shoes 9 joined by the serpentine spring 26 are positioned in aperture 22 of each of clamping members 20. Screw fasteners 38 are threaded into the internally threaded bores 34 of clamping members 20 and are tightened. As illustrated in FIGURE 2, the retaining shoes are originally in a cocked position and exert little or no force in the axial direction of the waveguide section. Displacement of clamp members 20 at right angles to the waveguide, exerts a force on retaining shoes 9 as the edges 32 of each clamp bear on the cam surface of the shoe members. The force exerted on the cam surfaces by the edges 32 is resolved into two force components, one parallel to the surface and the other at right angles thereto. The force component at right angles produces a rotational mvoement of the shoe about a pivot point formed by flange 28 of the shoe and the upper edge of clamp aperture 22. Rotation of the shoe due to this force brings tongue 17 into engagement with the inner side wall of waveguide slot 5, clamping the waveguide sections together. As the shoe rotates away from clamp edge 32, the force component parallel to the cam surface causes edge 32 to slide downwardly along the cam surface, maintaining contact between them, as the screw members are tightened. Thus, the transverse force exerted by clamp members 20 is translated into a force exerted along the axis of the waveguide sections.

The screws are tightened until shoes 9 are fully rotated and are seated firmly in the waveguide slot as illustrated in FIGURE 4. The amount of axial clamping force exerted on the waveguide section is thus a function of the torque in inch-pounds exerted on screws 38 and the angle from the vertical of the cam surface, since the force component at right angles to the surface (which produces the rotational translational movement) is proportional to the sine of this angle. It will be obvious to those skilled in the art that a preset torque in inch-pounds may be applied to the screws by utilizing torque wrenches or the like, which are capable of exerting a preset and fixed torque on a fastener such as screw members 43. One waveguide coupling assembly in accordance with the instant invention was constructed using a retaining shoe with a cam surface angle of 30°. The clamp was assembled and various values of torque in inch-pounds were applied, and the axial force on the waveguide in pounds was measured by means of a Tensile Tester and Dynamometer combination, Hercules Model K, manufactured by the W. C. Dillon & Co., Inc. of Chicago, Ill.

The following tabulation shows the relationship between torque and axial force on the waveguide joint:

| Torque in inch-pounds: | Axial force in pounds |
| --- | --- |
| 2 | 45 |
| 4 | 110 |
| 6 | 172 |
| 8 | 232 |
| 10 | 280 |
| 12 | 345 |
| 14 | 408 |
| 16 | 468 |

As may be seen from this tabulation, substantial axial forces may be produced for clamping the waveguide sections together by utilizing the novel coupling assembly described above. For example, by applying 14 to 16 inch-pounds of torque and using an RG50/U waveguide, which is 1.50 inches by 0.750 inch and has a wall thickness of 0.064 inch, axial clamping forces ranging between 1028 and 1180 pounds per square inch are produced. These clamping forces are effective to produce an RF-tight joint, even without the use of deformable gaskets or seals. It will also be apparent to those skilled in the art that with clamping pressures in the order of more than 1,000 pounds per square inch, the addition of a suitable gasket or deformable seal between the waveguide sections will also provide a very good pressure-tight joint capable of maintaining air or gas pressures within the waveguide in the range of 5 to 10 pounds per square inch or more.

Because no permanently attached flange member is required in the novel coupling means of the instant invention, no soldering or brazing is necessary in the coupling means. A most advantageous consequence of this is that aluminum waveguide alone, or copper-coated aluminum waveguide may be utilized in many applications. The use of aluminum instead of the more expensive all-copper waveguide required previously is an economic advantage of major proportions. Also, the clamps may be easily disconnected from the joint waveguide section, so that removal, maintenance, replacement or adjustment of the particular waveguide section is easily effected. This, it will be apparent, is due to the fact that only two screw fasteners are required for the coupling means of the present invention, both of which are acceptable on the same side of the waveguide. Thus, even if the waveguide is placed along a wall or along the back of a suitable rack or housing which must be positioned, in turn, against a wall, the waveguide can be installed so that only that side of the waveguide, including the clamping screw, is exposed.

While the preferred embodiment of the coupling arrangement illustrated and described previously shows the retaining shoe as including an angular cam surface and the clamping member having a pressure edge which engages the cam surface, it will be obvious to those skilled in the art that other equivalent motion translation arrangements are possible. For example, it is possible to provide the clamp member with the angular cam surface which engages an edge of a suitably formed retaining shoe to cam the shoe member inwardly against the side wall of the waveguide slot. It will be understood, therefore, that such a co-operating relationship results in the translation of a transverse force exerted to draw the clamp members together into a rotational movement which produces an inwardly directed longitudinal force along the axis of the waveguide in order to provide an effective joint between the waveguide sections.

While a particular embodiment of this invention has been shown, it will, of course, be understood that it is not limited thereto, since many modifications in the arrangement may be made. It is contemplated by the appended claims to cover any such modification as falls within the spirit and scope of this invention.

What I claim as new and desire to secure by Letters Patent of the United States is:

1. A coupling means for rapidly assembling and disassembling a pair of waveguide sections, each one of which has at least slot means formed in the walls thereof, comprising:

(a) a force transmitting clamp means for the said waveguide sections, (b) means for exerting force on said clamp means in a direction at right angles to said waveguide sections;

(c) force translating means associated with said clamp means for translating the force exerted on said clamp to a force along the axis of said waveguide section, including:

(1) retaining shoe means seated in said slot means, said shoe means having a cam surface adapted to be engaged by said clamp, (2) means constraining said shoe means into engagement with said clamp at a point other than said cam surface to form a pivot for said shoe means;

whereby the force exerted by said clamp on said cam surface produces rotational movement of said shoe means, thereby exerting axial force through said slot means on said waveguide sections.

2. A coupling for two waveguide sections, each one of which has a pair of shallow slots in opposite sides thereof defining upstanding pressure surfaces, comprising:
 (a) shoe members disposed in each of said slots;
 (b) a pair of clamp members disposed on opposite sides of said section and spanning the joint thereof, each of said clamp members cammingly engaging said shoe members associated therewith on the same side of said section;
 (c) means for drawing said clamp members together; and
 (d) said clamp members, when drawn together, camming said shoe members against the pressure surfaces of said slots and toward the joint, thereby joining said sections.

3. The device as recited in claim 2 wherein said means for drawing said clamp members together comprises a pair of screw fasteners, each of which threadingly engages the clamp members and spans the space therebetween.

4. The coupling as recited in claim 2 wherein each of said clamp members comprises a member of generally U-shaped cross-section defining a bight portion and a pair of leg portions, each of said bight portions including a central aperture for receiving said shoe members, spring means disposed in each of said apertures and engageable with said shoe members for retaining said shoe members therein, each of said leg portions including threaded apertures therein, and screw fasteners received in the threaded apertures in the leg portions of one of said clamp members and spanning the space between said clamp members for reception in the threaded apertures in the leg portions of the other of said clamp members for drawing said clamp members together.

References Cited

UNITED STATES PATENTS

| 532,328 | 1/1895 | Locke | 285—364 |
| 2,522,279 | 9/1950 | Koller et al. | 333—98 |
| 2,643,139 | 6/1953 | Hamilton | 285—406 |
| 3,132,312 | 5/1964 | Carey et al. | 333—98 |

FOREIGN PATENTS

| 522,602 | 6/1940 | England. |
| 605,348 | 7/1948 | England. |
| 808,403 | 7/1951 | Germany. |

EDWARD C. ALLEN, *Primary Examiner.*

CARL W. TOMLIN, *Examiner.*

W. L. SHEDD, *Assistant Examiner.*